Dec. 11, 1928.
1,694,609
L. R. WILLITS
BATTERY WATER LEVEL INDICATOR
Filed Dec. 10, 1927
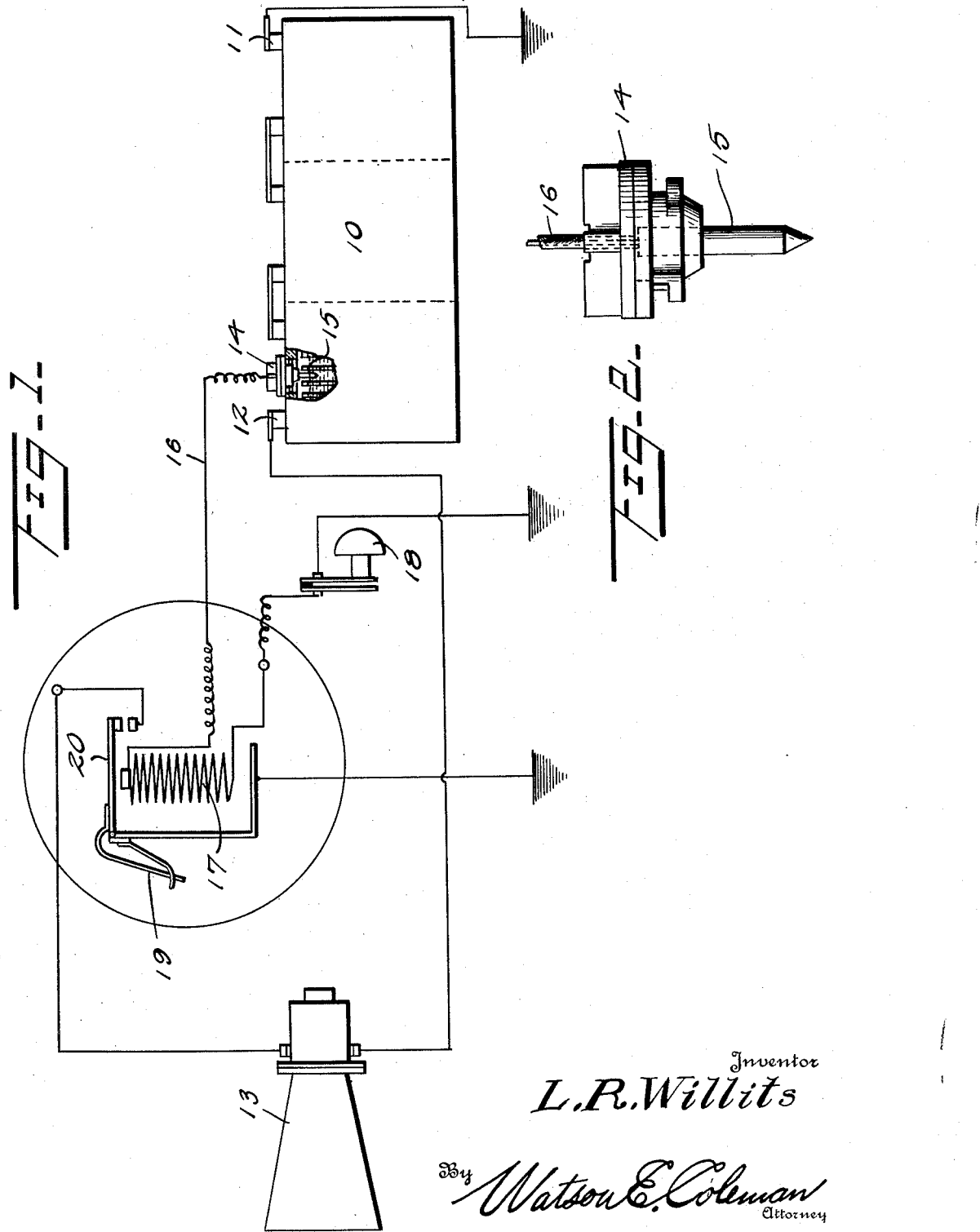
Inventor
L.R.Willits
By Watson E. Coleman
Attorney Patented Dec. 11, 1928.

1,694,609

UNITED STATES PATENT OFFICE.

LELAND ROSS WILLITS, OF ATLANTIC CITY, NEW JERSEY.

BATTERY WATER-LEVEL INDICATOR.

Application filed December 10, 1927. Serial No. 239,203.

This invention relates to battery water level indicators for the batteries of vehicles and more particularly to apparatus for providing an indication of the level of the storage battery of such nature that it operates independently of any function of the operator of the vehicle other than normal functions in driving the same.

A further object of the invention is to provide a device of this character by means of which a necessary part of the vehicle is rendered inoperative upon lowering of the level of the electrolyte in the battery to a predetermined degree, and in which the arrangement is such that prior to complete inoperation, faulty operation of said part results, giving an indication of the battery condition and a warning that this condition must be remedied.

A still further object of the invention is to provide a device of this character, which may be very readily applied to the systems of vehicles and which, with the exception of an ordinary relay, employs no parts other than those forming normal portions of the vehicle.

These and other objects I attain by the construction shown in the accompanying drawings, wherein for the purpose of illustration is shown a preferred embodiment of my invention and wherein:—

Figure 1 is a partially diagrammatic view showing a battery water level indicating system constructed in accordance with my invention;

Figure 2 is a side elevation showing the construction of the cap employed upon one of the cells of the battery.

Referring now more particularly to the drawings, the numeral 10 generally designates the storage battery of a vehicle and 11 and 12 the terminals thereof, one of which is grounded, as indicated, and the other of which is connected with one terminal of a signalling horn, generally designated at 13. The battery is of the usual storage type and in accordance with my invention, I substitute for the plug of the cell remote from that bearing the terminal 11 a plug 14 having a carbon terminal 15, which projects downwardly into the cell a predetermined distance. With this carbon terminal, a lead wire 16 is connected at one end and the opposite end of this wire is connected to one terminal of the coil 17 of a relay. The other terminal of the relay coil is connected with one terminal of the usual horn button generally designated at 18, the second terminal of this horn button being grounded in the usual manner, as indicated. One terminal of the relay is grounded and the second terminal thereof connected with the second terminal of the horn by a lead wire 19.

It will be obvious that as long as the level of electrolyte in the battery is normal that upon closing of the circuit by the switch 18, the coil 17 will be energized, attracting the armature 20 of the relay, completing the circuit of the horn 13 and causing normal operation thereof. If, however, the electrolyte level lowers beyond a certain point, the current transmitted to the coil 17 will decrease, with the result that while the current transmitted initially to the coil will be sufficient to attract the armature and close the circuit of the horn to start operation thereof, the current drawn by the horn motor will rob the coil 17 to such an extent that the armature will shift and the circuit of the horn opened. More current will thus pass through the coil 17 and the fluctuating operation of the horn will continue as long as the switch 18 is closed. Such fluctuating operation will immediately indicate to the operator that the electrolyte level is reaching a dangerously low point and that if it is not attended to immediately, the battery will suffer. Furthermore, he will be aware that unless prompt attention is given his audible signal, it is likely to become completely inoperative, with the result that he would be liable to arrest. In this connection, it is pointed out that most vehicle operators pay far more attention to operation of the horn than they pay to the battery probably because of the liability of penalties in event of its failure. It will thus be seen that by use of the apparatus disclosed, a signal as to the battery level is provided, which operates without any dependence upon the memory of the vehicle operator. My device differentiates from all previous devices with which I am familiar which either necessitates closing of the switch by the operator or by providing a continuously operating cylinder which places a continuous drain upon the battery.

Since the arrangement illustrated is capable of a certain range of change and modification without materially departing from the spirit of the invention, I do not limit myself to such specific structure except as hereinafter claimed.

I claim:—

1. In combination with a vehicle having an electrically operated audible signal, a normally open circuit for the signal including a secondary battery and a relay, an operating circuit for the relay including said secondary battery and a normally open switch, the operating circuit of the relay opening exteriorly to said switch upon a predetermined lowering of the level of the electrolyte of the secondary battery.

2. In combination, a storage battery, an audible signal with which one terminal of the storage battery is connected, a relay having one terminal connected to the second terminal of the storage battery and a second terminal connected with the second terminal of the audible signal, means including a normally open switch for connecting one terminal of the relay coil with one terminal of the battery and a connection between the other terminal of the coil of the relay and the battery comprising a terminal element projecting downwardly into the electrolyte of a cell of the battery for a predetermined distance.

3. In combination with a vehicle having an electrically operated audible signal, a normally open circuit for the signal including a secondary battery, a control circuit for closing the signal circuit and including a normally open switch, said control circuit being opened exteriorly to the switch by a predetermined lowering of the level of the electrolyte of the secondary battery.

In testimony whereof I hereunto affix my signature.

LELAND ROSS WILLITS.